(12) United States Patent
Meissner

(10) Patent No.: US 10,738,930 B2
(45) Date of Patent: Aug. 11, 2020

(54) COUPLING ARRANGEMENT FOR A DOMESTIC APPLIANCE, A DEVICE FOR A DOMESTIC APPLIANCE, AND A DOMESTIC APPLIANCE

(71) Applicant: Schlemmer GmbH, Poing (DE)

(72) Inventor: Roland Meissner, Schweinfurt (DE)

( * ) Notice: Subject to any disclaimer, the term of this patent is extended or adjusted under 35 U.S.C. 154(b) by 270 days.

(21) Appl. No.: 15/313,055

(22) PCT Filed: May 20, 2015

(86) PCT No.: PCT/EP2015/061170
§ 371 (c)(1),
(2) Date: Nov. 21, 2016

(87) PCT Pub. No.: WO2015/177241
PCT Pub. Date: Nov. 26, 2015

(65) Prior Publication Data
US 2017/0191598 A1      Jul. 6, 2017

(30) Foreign Application Priority Data

May 22, 2014   (EP) ..................... 14169546

(51) Int. Cl.
*F16L 55/07*         (2006.01)
*D06F 39/08*         (2006.01)
(Continued)

(52) U.S. Cl.
CPC .............. *F16L 55/07* (2013.01); *A47L 15/421* (2013.01); *A47L 15/4212* (2013.01);
(Continued)

(58) Field of Classification Search
CPC ............... A47L 15/421; A47L 15/4212; A47L 15/4217; D06F 39/081; D06F 39/082;
(Continued)

(56) References Cited

U.S. PATENT DOCUMENTS 1,956,692 A * 5/1934 Mcwane ............... F16L 13/122
                                                            285/295.3
1,985,325 A * 12/1934 Nathan ............... F16L 27/1133
                                                              277/615
(Continued)

FOREIGN PATENT DOCUMENTS

CN       103764895 A      4/2014
EP         1055860 A2 *  11/2000  ............. F16L 33/18
(Continued)

OTHER PUBLICATIONS

State Intellectual Property Office of the People's Republic of China, Office Action Issued in Application No. 201580026664.8, dated Apr. 3, 2018, 17 pages.
(Continued)

*Primary Examiner* — Mary E McManmon
*Assistant Examiner* — Richard K. Durden
(74) *Attorney, Agent, or Firm* — Alleman Hall Creasman & Tuttle LLP

(57) ABSTRACT

Examples are disclosed that relate to a coupling arrangement (36) for a domestic appliance (2), comprising: a connection piece (16) that has a channel (5) for transporting a fluid on its inner side, and a shoulder (18) on its outer side; an elastic bushing (19) that is pushed onto the connection piece (16) in an assembly direction (M), the bushing (19) having, on its inner side, a first shoulder (21) which engages behind the shoulder (18) of the connection piece (16), and a second shoulder (22) on its outer side; and a corrugated hose (26) that comprises, on an end section (28) thereof and on its inner side, a shoulder (35) which engages behind the second shoulder (22) of the bushing (19).

14 Claims, 2 Drawing Sheets

Figure 1:
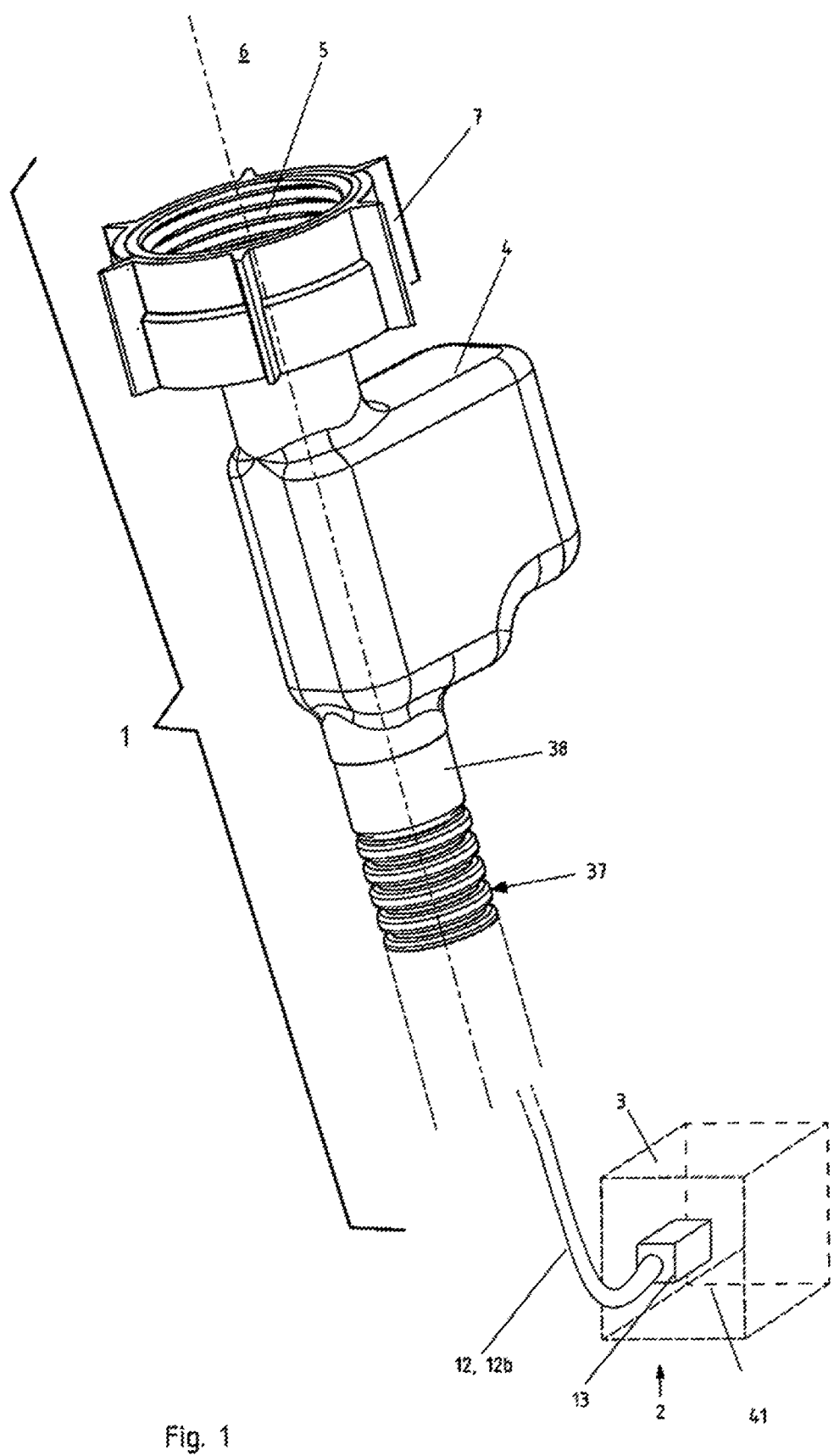

(51) Int. Cl.
*F16L 21/035* (2006.01)
*F16L 47/06* (2006.01)
*A47L 15/42* (2006.01)
*F16L 47/00* (2006.01)
*F16K 31/06* (2006.01)

(52) U.S. Cl.
CPC ........ *A47L 15/4217* (2013.01); *D06F 39/081* (2013.01); *D06F 39/082* (2013.01); *F16L 21/035* (2013.01); *F16L 47/065* (2013.01); *F16K 31/06* (2013.01); *F16L 47/005* (2013.01)

(58) Field of Classification Search
CPC . F16L 21/035; F16L 37/0985; F16L 37/0987; F16L 37/48; F16L 47/00; F16L 47/06; F16L 47/065; F16L 47/08; F16L 47/10; F16L 47/12; F16L 47/005; F16L 47/20; F16L 47/24
USPC ...... 285/240, 255, 258, 286.1, 295.1, 295.2, 285/295.3, 374, 239, 334.3
See application file for complete search history.

(56) References Cited

U.S. PATENT DOCUMENTS

| | | | | |
|---|---|---|---|---|
| 2,322,587 | A * | 6/1943 | Payne | F16L 13/11 285/285.1 |
| 2,518,829 | A * | 8/1950 | Smith | F16L 17/035 277/626 |
| 3,165,324 | A * | 1/1965 | Zopfi | F16L 21/02 277/615 |
| 3,208,757 | A * | 9/1965 | Jageman | F16L 13/161 277/607 |
| 3,521,914 | A * | 7/1970 | Delahunty | H02G 3/06 285/240 |
| 3,887,674 | A * | 6/1975 | Oostenbrink | B29C 57/08 264/523 |
| 3,913,928 | A * | 10/1975 | Yamaguchi | E03C 1/14 277/604 |
| 4,124,422 | A * | 11/1978 | Kusano | B29C 57/00 156/165 |
| 5,042,848 | A * | 8/1991 | Shiozaki | F16L 37/133 285/277 |
| 5,320,390 | A * | 6/1994 | Kodama | F16L 37/0985 285/308 |
| 5,462,311 | A * | 10/1995 | Cipolla | A47L 9/244 285/24 |
| 5,791,696 | A * | 8/1998 | Miyajima | F16L 11/11 285/222.1 |
| 5,829,795 | A * | 11/1998 | Riesselmann | F16L 33/2078 285/256 |
| 5,871,240 | A * | 2/1999 | Miyajima | F16L 11/11 285/222.1 |
| 6,193,238 | B1 * | 2/2001 | Sporre | F16L 21/035 277/609 |
| 6,345,844 | B1 * | 2/2002 | Miyajima | F16L 37/02 285/231 |
| 6,467,817 | B1 * | 10/2002 | Rhyman | F16L 37/084 285/319 |
| 6,860,487 | B2 * | 3/2005 | Shiokawa | F01N 13/1827 277/607 |
| 7,604,260 | B2 * | 10/2009 | Bonetto | F16L 33/2071 285/242 |
| 7,735,877 | B2 * | 6/2010 | Ito | F16L 21/035 285/239 |
| 2003/0127855 | A1 * | 7/2003 | Heverly | F16L 37/098 285/227 |
| 2008/0157520 | A1 * | 7/2008 | Ryhman | F16L 37/098 285/322 |
| 2009/0261580 | A1 * | 10/2009 | Zakrzewski | F16L 33/213 285/258 |

FOREIGN PATENT DOCUMENTS

| | | |
|---|---|---|
| EP | 1327812 A2 | 7/2003 |
| EP | 1955640 A2 | 8/2008 |
| EP | 2314752 A1 | 4/2011 |
| WO | 2012140595 A2 | 10/2012 |

OTHER PUBLICATIONS

ISA European Patent Office, International Search Report Issued in Application No. PCT/EP2015/061170, dated Jun. 26, 2015, WIPO, 4 pages.

* cited by examiner

COUPLING ARRANGEMENT FOR A DOMESTIC APPLIANCE, A DEVICE FOR A DOMESTIC APPLIANCE, AND A DOMESTIC APPLIANCE

The present invention relates to a coupling arrangement for a domestic appliance, to a device for a domestic appliance, and to a domestic appliance.

A coupling arrangement for a domestic appliance is known from EP 2 314 752 B1, for example. Said coupling arrangement comprises an interior corrugated hose onto which a sleeve is molded. This sleeve during fitting is push-fitted onto a connecting piece and secured thereon by means of a clamping piece.

An object of the present invention lies in providing an improved approach.

Accordingly, a coupling arrangement for a domestic appliance is provided. The coupling arrangement comprises a connecting piece which on the interior side has a duct for transporting a fluid, and on the exterior side has a shoulder. The coupling arrangement furthermore comprises an elastic sleeve which in a fitting direction is push-fitted onto the connecting piece, wherein the sleeve on the interior side has a first shoulder which engages behind the shoulder of the connecting piece, and on the exterior side has a second shoulder (behind the first shoulder in the fitting direction). The coupling arrangement furthermore comprises a corrugated hose which on an end portion on the interior side has a shoulder which engages behind the second shoulder of the sleeve.

It is advantageous in the case of this solution that neither injection-molding of a sleeve nor fastening by way of a clamping piece is required in order to provide a sealing connection between a corrugated hose and a connecting piece. This is because the sleeve is connected to the connecting piece by way of elastically engaging therebehind, and the end portion of the corrugated hose is connected to the sleeve likewise by way of elastically engaging therebehind. Furthermore, by virtue of the elastic sleeve, at least the end portion of the corrugated hose or else the entire corrugated hose may advantageously be formed from a comparatively rigid material. Accordingly, the connecting piece may also be formed from a rigid material.

In this way, for example, a detachment pressure of more than 5 bar, preferably more than 8 bar, furthermore preferably more than 10 bar, and even furthermore preferably more than 13 bar may be achieved. The detachment pressure refers to a fluid pressure in the corrugated hose that when exceeded releases the end portion of the corrugated hose from the connecting piece, counter to the fitting direction. Accordingly, a reliable connection that is capable of withstanding even high pressures may be provided.

In particular, the second shoulder of the sleeve may lie behind the first shoulder of the sleeve in the fitting direction.

The "fluid" may be a liquid, in particular water, or a gas, in particular water vapor, or mixtures thereof. The water may be fresh water or waste water, in particular.

A "fresh water connector" may comprise a tank for providing collected rain water.

The connecting piece, the sleeve and/or the corrugated hose extend along a longitudinal axis, specifically inside one another at least in portions, and are preferably disposed in a coaxial manner. In particular, the connecting piece, the sleeve and/or the corrugated hose (at least the end portion of the latter) are configured so as to be rotationally symmetrical in relation to the longitudinal axis thereof. To the extent that mention is presently made of "radial", "axial" or "in the circumferential direction", this refers at all times to the longitudinal axis.

The fitting direction points along the longitudinal axis and means that direction along which the sleeve is push-fitted onto the connecting piece, and the end portion of the corrugated hose is push-fitted onto the sleeve, so as to establish the coupling arrangement, or to make the mentioned components mutually engage behind one another in an elastic manner.

The corrugations of the corrugated hose may, for example, be sinusoidal, rectangular or have any other shape, for example also a helical shape.

The connection between the three construction elements (connecting piece, sleeve and corrugated hose) is preferably maintained by a form-fit. Additionally, the connection between the three construction elements may be maintained by a friction-fit.

The corrugated hose is preferably configured as a pressure hose and thus is suitable for withstanding usual pressures, in particular water pressures, in the domestic sector.

According to one embodiment, the sleeve, opposite the second shoulder, has a third shoulder on which the end portion of the corrugated hose axially bears.

By virtue of this bearing contact between the end portion and the third shoulder it is ensured that the shoulder of the end portion remains bearing in a sealing manner on the second shoulder of the sleeve. In other words, the end portion of the corrugated hose is thus fixed to the sleeve in and counter to the fitting direction.

According to one further embodiment, an axial strip of the end portion of the corrugated hose is axially jammed between the second and the third shoulder of the sleeve.

Particularly high tightness is achieved by virtue of this elastic clamp-fit.

According to one further embodiment, a diameter of the end portion of the corrugated hose widens in the fitting direction.

In particular, the end portion at a transition point to a corrugated portion of the corrugated hose thus has a first diameter, and in the region of the connecting piece, and/or in the region of the sleeve, has a second diameter, wherein the second diameter is larger than the first diameter. On account thereof, the corrugated portion may be formed having a comparatively small diameter, this being potentially advantageous in the case of applications in which a relatively minor diameter of the hose installation is desired, which may improve handling.

According to one further embodiment, the end portion has a tulip shape.

The latter can be readily manufactured, for example by an extrusion or injection-molding method.

According to one further embodiment, an inwardly directed radial strip of the end portion adjoins the tulip shape. Additionally or alternatively, the axial strip of the end portion adjoins the radial strip in the fitting direction.

The radial strip and the axial strip of the end portion of the corrugated hose define the shoulder of the latter.

According to one further embodiment, the tulip shape has a reinforcement bead.

On account thereof, the detachment pressure may be further increased.

According to one further embodiment, the end portion of the corrugated hose and/or the tulip shape is integrally formed with a corrugated portion of the corrugated hose.

Thus, the tulip shape and/or the end portion is not manufactured only in a post-manufacturing step of the corrugated hose. Rather, the end portion and/or the tulip shape is integrally manufactured, in particular originally molded, at the same time as the corrugated portion of the corrugated hose, for example by extruding or injection-molding.

According to one further embodiment, the sleeve is formed from an elastomer, in particular from rubber. The rubber may comprise a plastic or natural rubber material.

In principle, all polyolefins, in particular polyethylene, polypropylene or polyvinylchloride (PVC), may be considered as plastics.

According to one further embodiment, the sleeve in the fitting direction ahead of the first shoulder has a chamfer for compressing the sleeve when the end portion of the corrugated hose is push-fitted onto said sleeve.

After the shoulder of the end portion has passed the first shoulder of the sleeve, the sleeve widens again such that elastic engaging from behind arises. The connecting piece may also be referred to as a connector piece.

According to one further embodiment, the connector piece in the fitting direction ahead of the shoulder thereof has a chamfer for widening the sleeve when said sleeve is push-fitted onto the connector piece.

Once the sleeve passes the chamfer of the connector piece, the sleeve is relaxed, on account of which elastic engaging from behind arises. However, other possibilities for widening the sleeve would also be conceivable, for example by means of a respective tool.

According to one further embodiment, the corrugated hose is manufactured from polyethylene, polypropylene or polyvinylchloride (PVC).

In principle, the corrugated hose may also be manufactured from another polyolefin.

Furthermore, a device for a domestic appliance is provided. The device comprises an exterior hose and a coupling arrangement as has been described above. The corrugated hose at least partially extends within the exterior hose.

The corrugated hose thus forms an interior hose inside the exterior hose. Preferably, the interior hose is a pressure hose and/or the exterior hose is a protective hose.

According to one further embodiment, the device furthermore has a housing, which comprises the connecting piece, and a valve for blocking or unblocking the duct, said valve being disposed in the housing.

An electrical cable which runs in the annular gap between the exterior hose and the interior hose may furthermore be provided. The electrical cable may be specified for providing the valve with a signal and/or with power.

The device may furthermore have a sensor for detecting leaked liquid, and a controller installation which is specified for actuating the valve for blocking or unblocking the duct, depending on a signal from the sensor. The sensor may in particular be disposed in a collection region of the domestic appliance for collecting leaked liquid that exits from the interior hose in the case of a defect of the latter. In this case, the collection region is in liquid-conducting connection with the annular space between the exterior hose and the interior hose such that leaked liquid may flow off into said annular space.

In particular, the valve is an electromagnetically activated valve.

Furthermore, a domestic appliance having a coupling arrangement as has been described above, or a device as has been described above, is provided.

The domestic appliance may be a water-conducting domestic appliance, in particular a dishwasher or a washing machine.

Further potential implementations of the invention also comprise combinations which have not been explicitly mentioned of features or embodiments that are described above or hereunder with reference to the exemplary embodiments. Herein, a person skilled in the art will also add individual aspects as improvements or additions to the respective fundamental embodiment of the invention.

Figure 2:
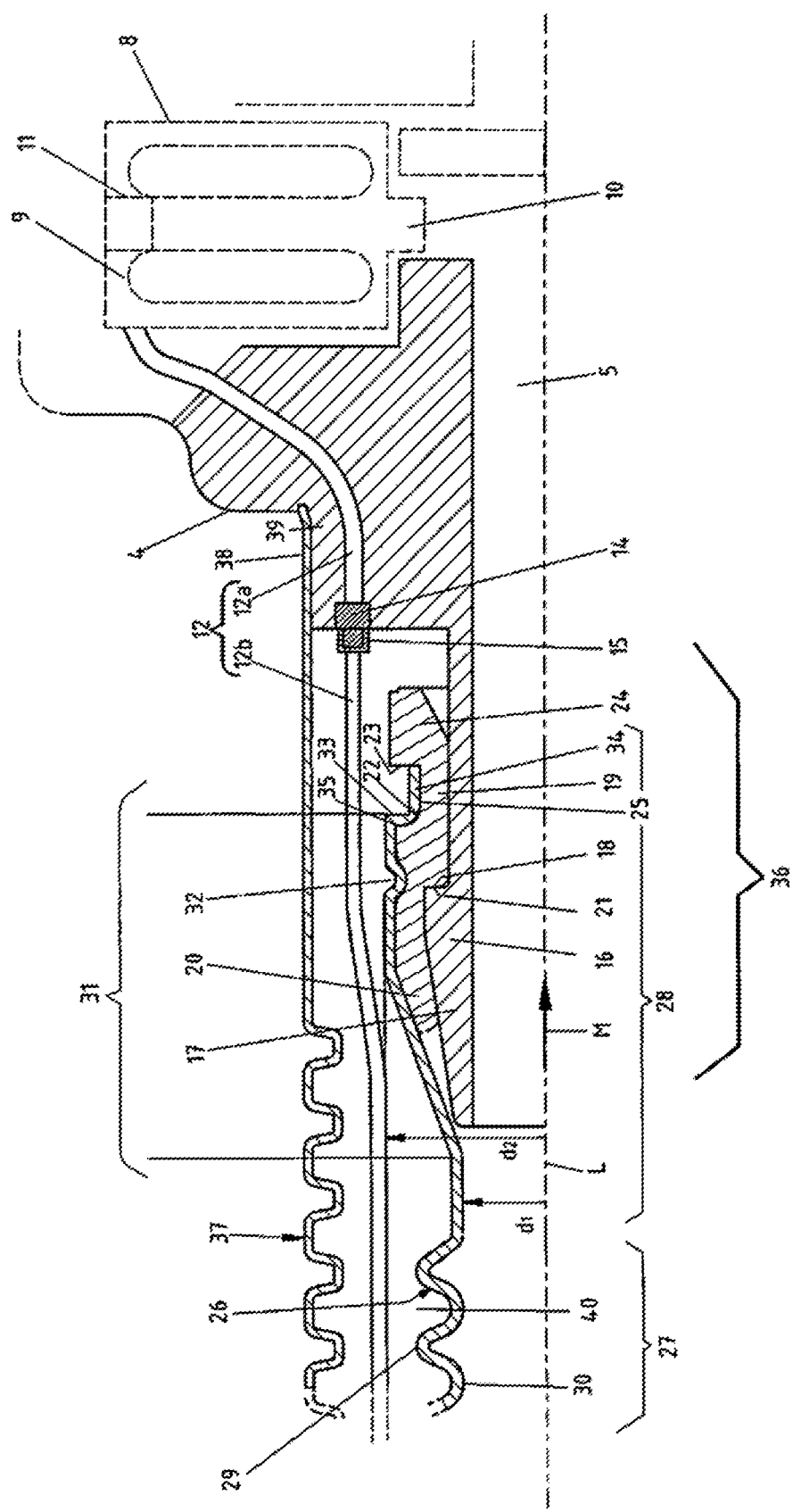

Further advantageous design embodiments and aspects of the invention are the subject matter of the dependent claims and of the exemplary embodiments of the invention that will be described hereunder. Furthermore, the invention will be explained in more detail by means of preferred embodiments with reference to the appended figures in which:

FIG. 1 shows a perspective view of a device for a domestic appliance, according to one embodiment; and FIG. 2 shows a longitudinal section of FIG. 1.

Unless stated to the contrary, identical or functionally identical parts are identified with the same reference signs in the figures.

A device 1 is shown in a perspective view in FIG. 1. The device 1 is a component part of a domestic appliance 2 that is indicated only by dashed lines, but the former may extend outside a base 3 thereof.

The device 1 comprises a housing 4 in which a duct 5 is configured. The duct 5 on a connector side 6 is connected to a fresh-water connection (not illustrated) for example, that is provided on the housing. To this end, a nut 7 by means of which the housing 4 is screw-fittable to a corresponding thread (not illustrated) of the fresh water connection may be provided.

As can be seen in the section of FIG. 2, a valve 8 is received in the housing 4. The valve 8 has a solenoid 9, for example, which activates a valve element 10 for blocking or unblocking the duct 5, depending on a control signal. The respective control signal may be generated by a controller installation 11, for example, which according to the exemplary embodiment is integrated in the valve 8. However, the controller installation 11 may just as well be provided at another point in the housing 4, or elsewhere in the domestic appliance 2, for example on a controller board (not shown) of the latter, disposed in the base 3. The controller installation 11 in turn is connected by means of an electrical cable 12 to a sensor 13 which is shown in FIG. 1.

The electrical cable 12 may be assembled from two portions 12*a*, 12*b*, wherein a first portion 12*a* of the electrical cable 12*a* runs in the housing 4 and in an electrically conducting manner connects a plug 14 on the periphery of the housing 4 to the controller installation 11. A second portion 12*b* of the electrical cable 12, at one end of the former, is releasably connected by means of a socket 15 to the plug 14, and at the other end of the former is coupled to the sensor 13. The functioning mode will be described in more detail hereunder.

The housing 4, opposite the connector side 6, has a connecting piece 16. The connecting piece 16 in the interior thereof configures part of the duct 5. The connecting piece 16 extends along a longitudinal axis L and may be configured so as to be rotationally symmetrical with the latter. To the extent that mention is presently made of "radial", "axial" or "in the circumferential direction", this refers at all times to the longitudinal axis L.

The connecting piece 16, in a fitting direction along the longitudinal axis L that is referred to as M, has a chamfer 17 of increasing diameter. A shoulder 18 adjoins the chamfer 17 in the fitting direction M.

A sleeve 19 is push-fitted onto the connecting piece 16 in the fitting direction M. The sleeve 19 likewise extends along the longitudinal axis L and is preferably configured so as to be rotationally symmetrical with the latter. The sleeve 19 is manufactured from an elastic material, for example rubber. The sleeve 19 also has a chamfer 20 which increases in diameter in the fitting direction M. On the interior side thereof, the sleeve 19 has a first shoulder 21 by means of which the former engages behind the shoulder 18 of the connecting piece 16 in an elastic manner. Furthermore, the sleeve 19 on the exterior side, and downstream of the first shoulder 21 in the fitting direction M, has a second shoulder 22 on the exterior side. The sleeve 19, opposite the second shoulder 22, comprises a third shoulder 23 which may be configured on a radial flange 24 of the sleeve 19, for example. The second shoulder 22, the third shoulder 23 and an annular face 25 of the sleeve 19 thus define a groove encircling the longitudinal axis L.

An interior hose 26 which is embodied as a corrugated hose is furthermore provided. Said interior hose 26 comprises a corrugated portion 27 and an end portion 28 that adjoins the latter. The corrugated portion 27 comprises wall portions 29 and 30, respectively, that are shaped as waves and troughs, the latter according to the exemplary embodiment describing a sinusoidal shape. However, the latter may just as well have an angular profile, for example a rectangular profile, or a helical geometry.

The end portion 28 is manufactured from the same material and in the same manufacturing step, in particular in an extrusion or injection-molding method, as the corrugated portion 27 of the corrugated hose 26.

The end portion 28 likewise extends along the longitudinal axis L, and is preferably configured so as to be rotationally symmetrical with the latter. The end portion 28 comprises a sleeve-like or tulip shape 31. The latter widens from a diameter d1 of the corrugated portion 27 toward a diameter d2 which encompasses the exterior side of the sleeve 19. The tulip shape 31 may be reinforced by means of a bead 32 that encircles the longitudinal axis L. A radial strip 33 which is inwardly directed in turn adjoins the tulip shape 31. An axial strip 34 in turn adjoins the radial strip 33 in the fitting direction M.

The radial strip 33 and the axial strip 34, on the interior side of the former and latter, jointly define a shoulder 35 which elastically engages behind the second shoulder 22 of the sleeve 19. When the end portion 28 is push-fitted over the sleeve 19, the shoulder 35 elastically snap-fits behind the shoulder 22 of the sleeve such that a corresponding form-fit results here. The axial strip 34 herein is elastically clamped between the shoulders 22, 23 of the sleeve 19 such that a particularly good sealing effect results. For example, a detachment pressure of more than 8 bar may be achieved in this way.

The end portion 28, the sleeve 19 and the connecting piece 16 configure a coupling arrangement 36 which enables a tight connection between a corrugated hose 26 and a connecting piece 16 to be established in a simple manner. Advantageously, the interior hose 26 and the connecting piece 16 herein may be formed from a comparatively rigid material which advantageously may be provided with a corresponding thin wall. The elasticity that is required for elastically engaging from behind herein is preferably provided only by the elastic sleeve 19. The latter at least has a greater elasticity than the end portion 28 or the connecting piece 16.

According to the exemplary embodiment, the interior hose 26 runs within an exterior hose 37 of the device 1. The exterior hose 37 is also shown in FIG. 1. Said exterior hose 37 is likewise configured as a corrugated hose, for example, and for this purpose may have sinusoidal or rectangular or otherwise shaped corrugations. Furthermore, the exterior hose 37 may likewise comprise a tulip shape 38 by means of which the former is push-fitted and thereby fastened onto a corresponding housing portion 39 of the housing 4. The coupling arrangement 36 is disposed within the tulip shape 38.

The interior hose 26 and/or the exterior hose 37 may be formed from polyethylene, polypropylene, polyvinylchloride (PVC) or any other polyolefin or plastics. Said interior hose 26 and/or exterior hose 37 may jointly define an annular space 40 in which the second portion 12b of the electrical cable 12 runs. Leaked water that potentially exits from the interior hose 26 in the case of a defect of the latter is collected in the annular space 40 and is directed toward the collection tub 41, shown in FIG. 1, in the base 3 of the domestic appliance 2. The sensor 13 is disposed in the collection tub 41 and there detects the presence of leaked liquid. The sensor 13, depending on the presence of leaked liquid, or depending on the fill level of the leaked liquid in the collection base 41, then by means of the electrical cable 12 supplies a corresponding sensor signal to the controller installation 11 (see FIG. 2).

Although the invention has presently been described by means of preferred exemplary embodiments, said invention is not limited thereto in any way but rather is modifiable in many ways.

LIST OF REFERENCE SIGNS

1 Device
2 Domestic appliance
3 Base
4 Housing
5 Duct
6 Connector side
7 Nut
8 Valve
9 Solenoid
10 Valve element
11 Controller installation
12 Electrical cable
12a, 12b Portions
13 Sensor
14 Plug
15 Socket
16 Connecting piece
17 Chamfer
18 Shoulder
19 Sleeve
20 Chamfer
21 First shoulder
22 Second shoulder
23 Third shoulder
24 Flange
25 Annular face
26 Interior hose
27 Corrugated portion
28 End portion
29 Wall portion
30 Wall portion
31 Tulip shape
32 Bead
33 Radial strip
34 Axial strip
35 Shoulder
36 Coupling arrangement 37 Exterior hose
38 Tulip shape
39 Housing
40 Annular space
41 Collection tub
d1, d2 Diameter
L Longitudinal axis
M Fitting direction

The invention claimed is:

1. A coupling arrangement for a domestic appliance, having:
  a connecting piece comprising an interior duct for transporting a fluid and an exterior shoulder,
  an elastic sleeve which in a fitting direction is push-fitted onto the connecting piece, wherein the sleeve has an interior first shoulder which engages behind the shoulder of the connecting piece, and has, downstream of the interior first shoulder in the fitting direction, an exterior second shoulder, and
  a corrugated hose which on an end portion thereof has an interior shoulder elastically engaging behind the second shoulder of the sleeve such that, with the end portion push-fitted over the sleeve, the interior shoulder of the corrugated hose is elastically snap-fitted behind the second shoulder of the sleeve such that the interior shoulder of the corrugated hose form-fits with the second shoulder of the sleeve, thereby resisting release of the end portion from the connecting piece counter to the fitting direction, wherein
  a diameter of the end portion of the corrugated hose widens in the fitting direction;
  the end portion of the corrugated hose has a tulip shape that widens from a diameter $d_1$ of a corrugated portion of the corrugated hose toward a diameter $d_2$ that encompasses an external side of the sleeve; and
  an inwardly directed radial strip of the end portion adjoins the tulip shape, and wherein an axial strip of the end portion adjoins the radial strip in the fitting direction.

2. The coupling arrangement as claimed in claim 1, wherein the sleeve, opposite the second shoulder, has a third shoulder against which the end portion of the corrugated hose is axially abutting with the end portion push-fitted over the sleeve.

3. The coupling arrangement as claimed in claim 2, wherein the axial strip of the end portion of the corrugated hose is elastically clamped between the second and the third shoulders of the sleeve with the end portion push-fitted over the sleeve.

4. The coupling arrangement as claimed in claim 1, wherein the tulip shape has a reinforcement bead.

5. The coupling arrangement as claimed in claim 1, wherein the end portion of the corrugated hose having the tulip shape is integrally formed with the corrugated portion of the corrugated hose.

6. The coupling arrangement as claimed in claim 1, wherein the sleeve is formed from an elastomer.

7. The coupling arrangement as claimed in claim 1, wherein the sleeve has, in the fitting direction ahead of the first shoulder, a chamfer for compressing the sleeve when the end portion of the corrugated hose is push-fitted onto said sleeve.

8. The coupling arrangement as claimed in claim 1, wherein the connecting piece has, in the fitting direction ahead of the shoulder thereof, a chamfer for widening the sleeve when said sleeve is push-fitted onto the connecting piece in the fitting direction.

9. The coupling arrangement as claimed in claim 1, wherein the corrugated hose is made from polyethylene, polypropylene or polyvinylchloride.

10. A device for a domestic appliance, having:
  an outer hose, and
  a coupling arrangement as claimed in claim 1, wherein at least the corrugated hose at least partially extends within the outer hose.

11. The device as claimed in claim 10, furthermore having a housing which comprises the connecting piece, and a valve for closing or opening the duct, said valve being disposed in the housing.

12. A domestic appliance having a device as claimed in claim 10.

13. A domestic appliance having a coupling arrangement as claimed in claim 1.

14. The device as claimed in claim 1, wherein the corrugated hose is more rigid than the elastic sleeve.

* * * * *